United States Patent
Kegel

(10) Patent No.: US 8,244,891 B2
(45) Date of Patent: Aug. 14, 2012

(54) SIMULATING A LARGE NUMBER OF USERS

(75) Inventor: Daniel Kegel, Los Angeles, CA (US)

(73) Assignee: Ixia, Calabasas, CA (US)

( * ) Notice: Subject to any disclaimer, the term of this patent is extended or adjusted under 35 U.S.C. 154(b) by 754 days.

(21) Appl. No.: 10/795,923

(22) Filed: Mar. 8, 2004

(65) Prior Publication Data
US 2005/0198246 A1 Sep. 8, 2005

(51) Int. Cl.
G06F 15/16 (2006.01)
G06F 15/173 (2006.01)
G06F 17/30 (2006.01)

(52) U.S. Cl. ........ 709/230; 709/203; 709/219; 709/234; 709/207; 709/215; 703/21; 707/697; 707/758; 707/918; 707/695; 707/955; 370/429; 370/389; 370/238; 370/252; 370/401; 711/113

(58) Field of Classification Search .................. 709/230, 709/313, 223
See application file for complete search history.

(56) References Cited

U.S. PATENT DOCUMENTS

| | | | |
|---|---|---|---|
| 5,247,517 A | 9/1993 | Ross et al. | |
| 5,343,463 A | 8/1994 | van Tetering et al. | |
| 5,477,531 A | 12/1995 | McKee | |
| 5,535,338 A | 7/1996 | Krause et al. | |
| 5,568,471 A | 10/1996 | Hershey et al. | |
| 5,590,285 A | 12/1996 | Krause et al. | |
| 5,600,632 A | 2/1997 | Schulman | |
| 5,787,253 A | 7/1998 | McCreery et al. | |
| 5,878,032 A | 3/1999 | Mirek et al. | |
| 5,905,713 A | 5/1999 | Anderson et al. | |
| 5,974,237 A | 10/1999 | Shurmer et al. | |
| 6,028,847 A | 2/2000 | Beanland | |
| 6,044,091 A | 3/2000 | Kim | |
| 6,091,802 A * | 7/2000 | Smith et al. ................ | 379/10.03 |
| 6,108,800 A | 8/2000 | Asawa | |
| 6,122,670 A | 9/2000 | Bennett et al. | |
| 6,148,051 A | 11/2000 | Fujimori | |
| 6,172,989 B1 | 1/2001 | Yanagihara et al. | |

(Continued)

FOREIGN PATENT DOCUMENTS
EP 0895375 2/1999

OTHER PUBLICATIONS

Tatham, Simon, Coroutines in C, website: http://www.chiark.greenend.org.uk/~sgtatham/coroutines.html, 2000.

(Continued)

Primary Examiner — Jude Jean Gilles
(74) Attorney, Agent, or Firm — SoCal IP Law Group LLP; Mark A. Goldstein; Steven C. Sereboff

(57) ABSTRACT

Simulating a large number of users is described. A method may include receiving a test script including a plurality of commands and invoking a script interpreter. An application thread may be launched to execute the test script. A protocol engine may be invoked for each of the commands in the test script such that each protocol engine has an associated command. Each protocol engine may execute its associated command. A system on which the method may be executed may include one or more chassis or computing devices having one or more network cards. The chassis and/or computing devices may be connected to one or more networks.

30 Claims, 5 Drawing Sheets

U.S. PATENT DOCUMENTS

| | | | |
|---|---|---|---|
| 6,233,256 B1 | 5/2001 | Dieterich et al. | |
| 6,321,264 B1 | 11/2001 | Fletcher | |
| 6,343,078 B1 | 1/2002 | Bronstein et al. | |
| 6,345,302 B1 | 2/2002 | Bennett et al. | |
| 6,363,056 B1 | 3/2002 | Beigi et al. | |
| 6,446,121 B1 | 9/2002 | Shah | |
| 6,483,840 B1 | 11/2002 | Vogel | |
| 6,507,923 B1 | 1/2003 | Wall et al. | |
| 6,545,979 B1 | 4/2003 | Poulin | |
| 6,621,805 B1 | 9/2003 | Kondylis et al. | |
| 6,789,100 B2 | 9/2004 | Nemirovsky | |
| 6,845,352 B1 | 1/2005 | Wang | |
| 6,950,405 B2 | 9/2005 | Van Gerrevink | |
| 7,145,879 B1 | 12/2006 | Kasai | |
| 7,327,686 B2 | 2/2008 | Standridge | |
| 7,596,791 B2* | 9/2009 | Wei et al. | 719/316 |
| 7,653,912 B2* | 1/2010 | Frank et al. | 719/318 |
| 2002/0080781 A1 | 6/2002 | Gustavsson | |
| 2003/0009544 A1 | 1/2003 | Wach | |
| 2003/0043434 A1 | 3/2003 | Brachmann et al. | |
| 2003/0067874 A1* | 4/2003 | See et al. | 370/230.1 |
| 2003/0107596 A1* | 6/2003 | Jameson | 345/762 |
| 2003/0139919 A1 | 7/2003 | Sher | |
| 2003/0202486 A1 | 10/2003 | Anton | |
| 2003/0219040 A1 | 11/2003 | Kim | |
| 2003/0231741 A1 | 12/2003 | Rancu et al. | |
| 2004/0010612 A1 | 1/2004 | Pandya | |
| 2004/0030757 A1 | 2/2004 | Pandya | |
| 2005/0176473 A1* | 8/2005 | Melpignano | 455/574 |
| 2005/0257109 A1* | 11/2005 | Averbuj et al. | 714/733 |

OTHER PUBLICATIONS

Laird, Cameron, Is Stackless Python for You?, website: http://www.developer.com/open/print/php/10930_630761_2, Dec. 6, 2000.

Linux, Linux Programmer's Manual, EPOLL(4), website: http://www.xmailserver.org/linux-patches/epoll.txt, Oct. 23, 2002.

Potonniee, O. and Stefani, J-B, Synchronous Thread Management in a Distributed Operating System's Micro Kernel, European Conference on Parallel Processing, LNCS 1300, Heidelberg, 1997.

Kegel, Dan, The C10K problem, website: http://kegek,com/c10k.html, Nov. 2, 2003.

Libensi, Davide, Improving (network) I/O performance, website: http://www.xmailserver.org/linus-patches/nio-improve.html, Oct. 30, 2002.

Provos, N. and Lever, C., Scalable Network I/O in Linux, Center for Information Technology Integration, University of Michigan, Technical Report 00-4, May 2, 2000.

Chandra, A. and Mosberger, D., Scalability of Linux Event-Dispatch Mechanisms, Hewlett Packard, HP Laboratories, Palo Alto, HPL-2000-174, Dec. 14, 2000.

Tismer, Christian, Stackless Python: A Python Implementation that does not use the C Stack, website: http://stackless.com/index_old.htm, Jan. 23, 2000.

* cited by examiner

SIMULATING A LARGE NUMBER OF USERS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

1. Field of the Invention

The invention relates to networks and network testing.

2. Description of Related Art

Networks such as the Internet provide a variety of data communicated using a variety of network devices including servers, routers, hubs, switches, and other devices. Before placing a network into use, the network, including the network devices included therein, may be tested to ensure successful operation. Network devices may be tested, for example, to ensure that they function as intended, comply with supported protocols, and can withstand anticipated traffic demands.

To assist with the construction, installation and maintenance of networks and network devices, networks may be augmented with network analyzing devices, network conformance systems, network monitoring devices, and network traffic generators, all of which are referred to herein as network testing systems. The network testing systems may allow for the sending of network communications.

DETAILED DESCRIPTION OF THE INVENTION

Throughout this description, the embodiments and examples shown should be considered as exemplars, rather than limitations on the elements claimed below.

Environment

Figure 1:
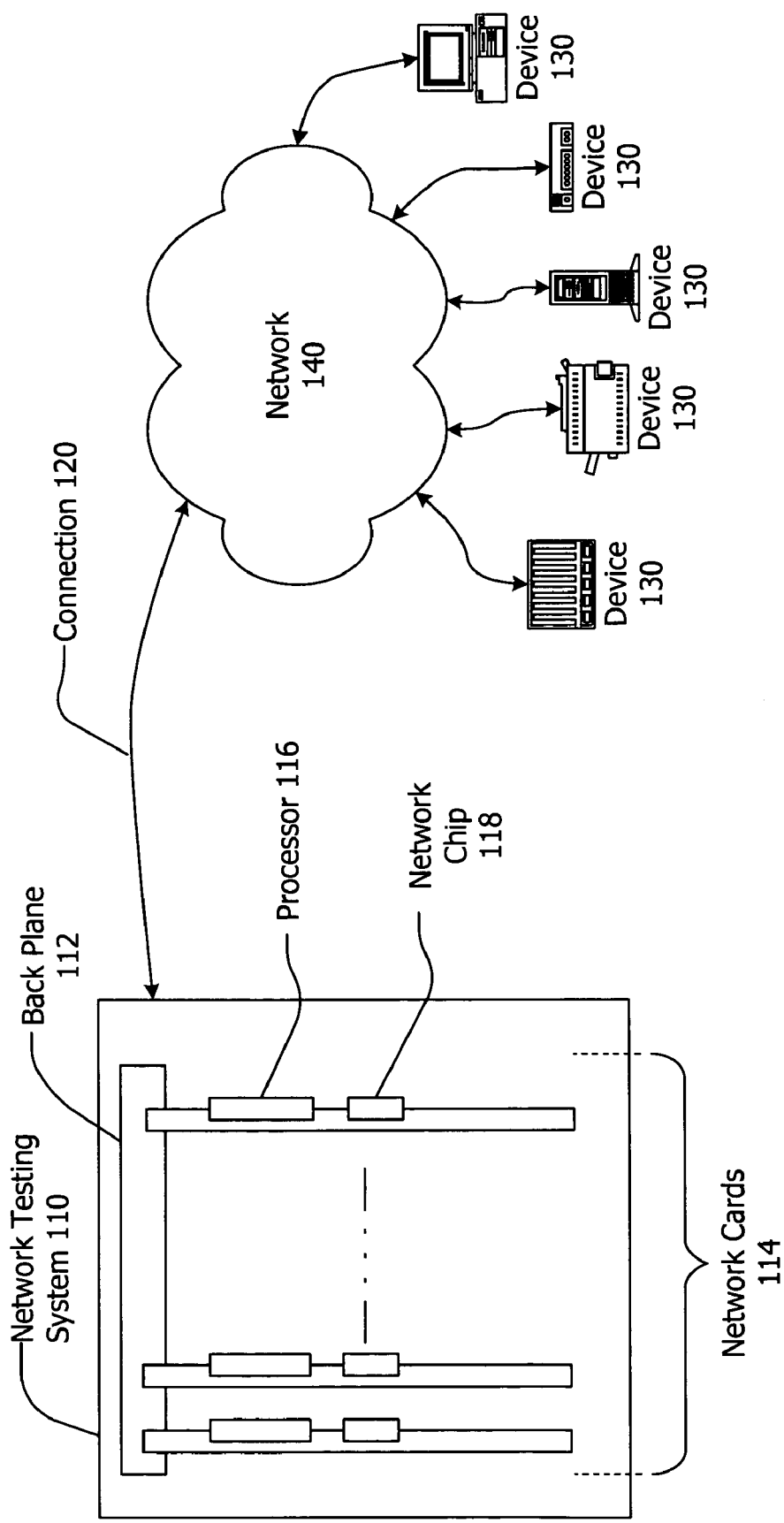
FIG. 1 is a block diagram of an environment in accordance with the invention.

Referring to FIG. 1, there is shown a block diagram of an environment in accordance with the invention. The environment includes network testing system 110 coupled to a network 140. The network testing system 110 may include or be one or more of a network traffic generator, a performance analyzer, a conformance validation system, a network analyzer, a network management system, and/or others.

The network testing system 110 may be in the form of a chassis or card rack, as shown in FIG. 1, or may be an integrated unit. Alternatively, the network testing system may comprise a number of separate units such as two or more chassis cooperating to provide network analysis, network traffic analysis, network conformance testing, and other tasks. The chassis of the network testing system 110 may include one or more network cards 114 and a back plane 112. The chassis of the network testing system 110 and/or one or more of the network cards 114 may be coupled to the network 140 via one or more connections 120. The network cards 114 may be permanently installed in the network testing system 110, may be removable, or may be a combination thereof.

The network testing system 110 and the network cards 114 may support one or more well known higher level communications standards or protocols such as, for example, the User Datagram Protocol (UDP), Transmission Control Protocol (TCP), Internet Protocol (IP), Internet Control Message Protocol (ICMP), Hypertext Transfer Protocol (HTTP), address resolution protocol (ARP), reverse address resolution protocol (RARP), file transfer protocol (FTP), Simple Mail Transfer Protocol (SMTP); may support one or more well known lower level communications standards or protocols such as, for example, the 10 Gigabit Ethernet standard, the Fibre Channel standards, and one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI); may support proprietary protocols; and may support other protocols. Each network card 114 may support a single communications protocol, may support a number of related protocols, or may support a number of unrelated protocols.

The term "network card" encompasses line cards, test cards, analysis cards, network line cards, load modules, interface cards, network interface cards, data interface cards, packet engine cards, service cards, smart cards, switch cards, relay access cards, CPU cards, port cards, and others. The network cards may be referred to as blades. The network cards 114 may include one or more computer processors, field programmable gate arrays (FPGA), application specific integrated circuits (ASIC), programmable logic devices (PLD), programmable logic arrays (PLA), processors, other kinds of devices, and combinations of these. The network cards 114 may include memory such as, for example, random access memory (RAM). In addition, the network cards 114 may include software and/or firmware. One or more of the network cards 114 may have a resident operating system included thereon, such as, for example, a version of the Linux operating system.

At least one network card 114 in the network testing system 110 may include a circuit, chip or chip set, such as network chip 118, that allows for communication over a network as one or more network capable devices. A network capable device is any device that may communicate over the network 140.

The connections 120 may be wire lines, optical fiber cables, wireless, others, and combinations of these. Although only one connection 120 is shown, multiple connections with the network 140 may exist from the network testing system 110 and the network cards 114 to the network 140.

The back plane 112 may serve as a bus or communications medium for the network cards 114. The back plane 112 may also provide power to the network cards 114.

The network testing system 110, as well as one or more of the network cards 114, may include software that executes to achieve the techniques described herein. As used herein, "software" refers to instructions that may be executed by a computer processor. The software may be implemented in a computer language, and may be object code, may be assembly or machine code, a combination of these, and others. The term "application" refers to one or more software modules, software routines or software programs and combinations thereof. The techniques described herein may be implemented as software in the form of one or more applications, plug-ins, lower level drivers, object code, and/or other software.

The software may be stored on and executed from any local or remote machine readable medium such as, for example, without limitation, magnetic media (e.g., hard disks, tape, floppy disks), optical media (e.g., CD, DVD), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium. Examples of storage devices include CD players, DVD players, flash memory card readers, and others.

The network testing system 110 may include a CPU card that allows the chassis to also serve as a computer workstation. The network testing system 110 may have coupled therewith a display and user input devices such as a keyboard, mouse, pen and trackball, and others. A hard disk drive or other storage device may be included in network testing system 110 to store software that implements the techniques described herein.

The network testing system 110 may be located physically adjacent to or remote to the devices 130 coupled with the network 140.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these.

Communications on the network 140 may take various forms, including frames, cells, datagrams, packets or other units of information, all of which are referred to herein as data units. Those data units that are communicated over a network are referred to herein as network traffic. The network 140 may be comprised of numerous nodes providing numerous physical and logical paths for data units to travel. There may be plural logical communications links between the network testing system 110 and a given network capable device 130. Examples of logical communications links include, without limitations, channels, pipes, streams, and others.

The network 140 may be a test network, a production network, other network, or a combination of these. The term "production network" as used herein means a network that is up and running in the regular course of business. As such, a production network includes network traffic from and between end users and other client devices and servers such as web servers and application servers, as well as other network capable devices attached to or otherwise communicating over the production network. The term "test network" means any network that is to be tested, including private segregated networks and publicly accessible networks. The network testing system 110 may send or otherwise transmit or communicate data units directed to network capable devices such as devices 130 over the network 140.

The network capable devices 130 may be devices capable of communicating over the network 140. The network capable devices 130 may be computing devices such as workstations, personal computers, servers, portable computers, telephones, personal digital assistants (PDAs), computing tablets, and the like; peripheral devices such as printers, scanners, facsimile machines and the like; network capable storage devices including disk drives such as network attached storage (NAS) and SAN devices; and networking devices such as routers, relays, firewalls, hubs, switches, bridges, traffic accelerators, and multiplexers. In addition, the network capable devices 130 may include appliances such as refrigerators, washing machines, and the like as well as residential or commercial HVAC systems, alarm systems, set-top boxes, personal video recorders, and other devices or systems capable of communicating over a network. One or more of the network capable devices 130 may be a device to be tested and may be referred to as a device under test.

The network testing system 110 may be or include one or more computing devices, particularly network capable workstations and personal computers. The computing devices may be used in place of or to augment a chassis.

Systems

Figure 2:
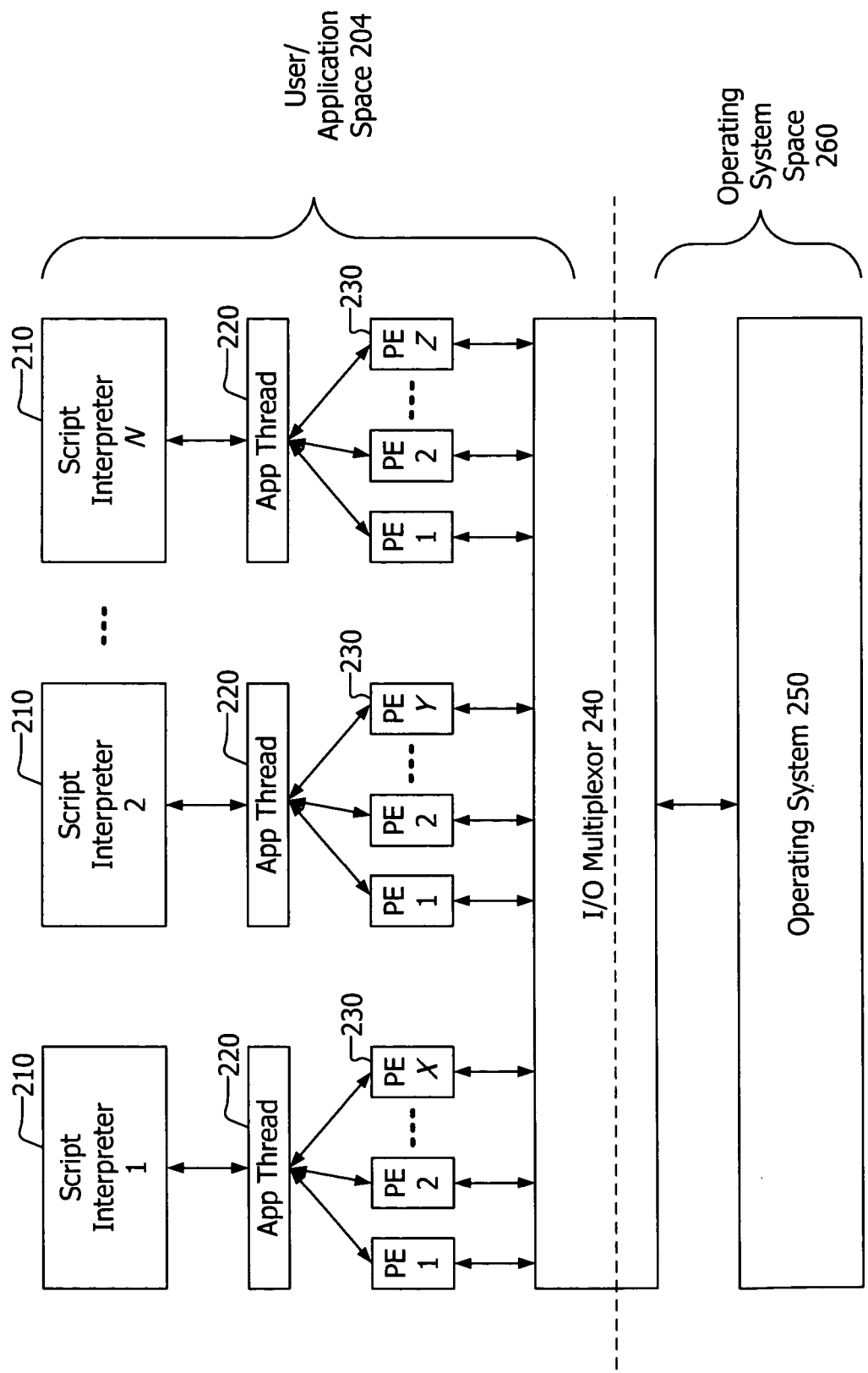
FIG. 2 is a first functional block diagram of operating units in accordance with the invention.

FIG. 2 is a first functional block diagram of operating units in accordance with the invention. A network testing system may provide a user interface that allows a user of the network testing system to create test scripts. Test scripts may also be provided by automated testing systems. That is, the test scripts may be computer or system generated. The test scripts may be automatically generated based on analysis of production network traffic or traffic directed to a particular network device, such as a server. A test script may include a sequence of commands or instructions that cause network traffic to be created and transmitted by the network testing system. Each test script may replicate the network traffic generated by a single network user or a group of network users. Each test script may represent or be a simulated virtual user or a group of simulated virtual users. Each test script may be used to stress test a device under test and/or a portion of a network and/or a network. Such a portion of a network or network may include one or more devices under test.

For each test script received, an instance of a script interpreter 210 is executed.

In one testing scenario, when a script represents the activities of a single user, multiple instances of a single script may be executed to represent multiple users. In traditional network testing systems, an operating system thread may be executed for each script. A thread is a relatively large or heavyweight feature of an operating system that allows multiple operating system tasks to be executed concurrently. The use of threads allows for parallel execution of multiple concurrent tasks. When using a large number of threads, communications between the operating system and the threads are required. The communications between the threads and the operating system that are required to maintain, monitor and execute a large number of threads expend system resources in the form of processor cycles and memory. In this way, the communications between the threads and the operating system required to execute a large number of threads reduces network testing system performance.

Although threads are in some ways well suited to running multiple test scripts or multiple instances of a small number of test scripts concurrently, when used in large quantities, threads may make excessive use of network testing system resources such as memory (actual or virtual), and/or processing power. In some instances, when using a large number of threads to execute test scripts, the amount of addressable memory may be used up before the number of scripts needed to fill a large bandwidth communication line are executed.

In some traditional systems, the overhead (that is, memory requirements) of executing each script as a thread may limit the number of scripts, and thus the number of virtual simulated users. However, to fill up a large bandwidth communication medium, such as, for example, a 1 Mbps, 100 Mbps, or 1 Gbps line, and/or to stress test a device under test with a large number of data units, 10,000 to 30,000 or more test scripts may be required. To test a device, network portion or network to determine how it will behave under heavy network traffic usage and/or heavy network traffic loads, the concurrent execution of many more scripts may be required than is possible in traditional network testing systems. Using the techniques described herein, many more test scripts than have been traditionally executable may be executed by a network testing system to fully stress a device under test and/or to maximize usage of the available bandwidth of a communication channel for testing purposes.

Rather than use traditional operating system threads, application threads may be used. Application threads are a lighter weight construct that require a smaller amount of network testing system resources to execute. That is, application threads require a smaller amount of memory and processor power to execute when compared with traditional threads. In addition, lighter weight threads require less communication between the thread and the operating system. As such, many more application threads may be executed in parallel or concurrently than traditional threads. Application threads may be implemented in many computer languages using various kinds of computer programming constructs. In one embodiment, the application threads are implemented using co-routines using the "C" programming language.

Application threads may invoke extended operations supported by the operating system. The extended operations may be included as part of the operating system kernel, may be plug-ins to the operating system, may be DLL files, may be other higher and lower level software extensions included in or accessible by an operating system. The extended operations may provide specific pre-programmed functionality with lower overhead when executed by application threads rather than traditional threads. The extended operations may allow for relatively simple actions such as opening connections, sending bytes, and closing a connection. In the network testing context, the functionality provided by the extended operations may include verification, fetch, fetch and ignore, monitor, count, and others. More specifically, a "fetch and verify" extended operation may allow for fetching data units via FTP, HTTP or other protocol and verifying the contents of the received data units. Such a command eliminates the transfer of the contents of the data unit from the operating system to an application program for verification, because the data unit has already been verified. Another extended operation may be "fetch and ignore." This extended operation may allow for receipt of data units when the script or requesting application has no interest in the payload or content of the data units. This reduces system overhead as the operating system will not expend resources either verifying the contents of the data unit or sending the contents of the data unit to a requesting script or application.

For each test script, the script interpreter 210 invokes an application thread, 220. For each instruction in the command lines in the test scripts, the application thread launches a protocol engine 230. The protocol engines 230 prepare the appropriate call to an operating system 250 to achieve the instruction. The operating system 250 may be a version of the Linux, Unix, Microsoft Windows, Apple and other operating systems. The operating system may include extended operations such that the command lines in the scripts may be extended operations.

So that the protocol engines 230 do not have to wait for or block on the operating system 250, an input/output (I/O) multiplexor 240 may be inserted between the protocol engines 230 and the operating system 250.

The I/O multiplexor 240 may receive calls to the operating system 250 from the protocol engines 230 and direct the calls to the operating system 250 when the operating system 250 is available. The I/O multiplexor 240 may also receive any responses from the call placed with the operating system 250 from the operating system 250. The I/O multiplexor 240 may pass any response to a call to the appropriate protocol engine 230.

In one embodiment, the operating system exists in the operating system space 260, and the script interpreters 210, application threads 220 and the protocol engines exist in the user or application space 204. The I/O multiplexor has an interface directly with the protocol engines 230 and with the operating system 250. As such, the multiplexor 240 exists in both the user or application space 204 as well as in the operating system space 260.

Figure 3:
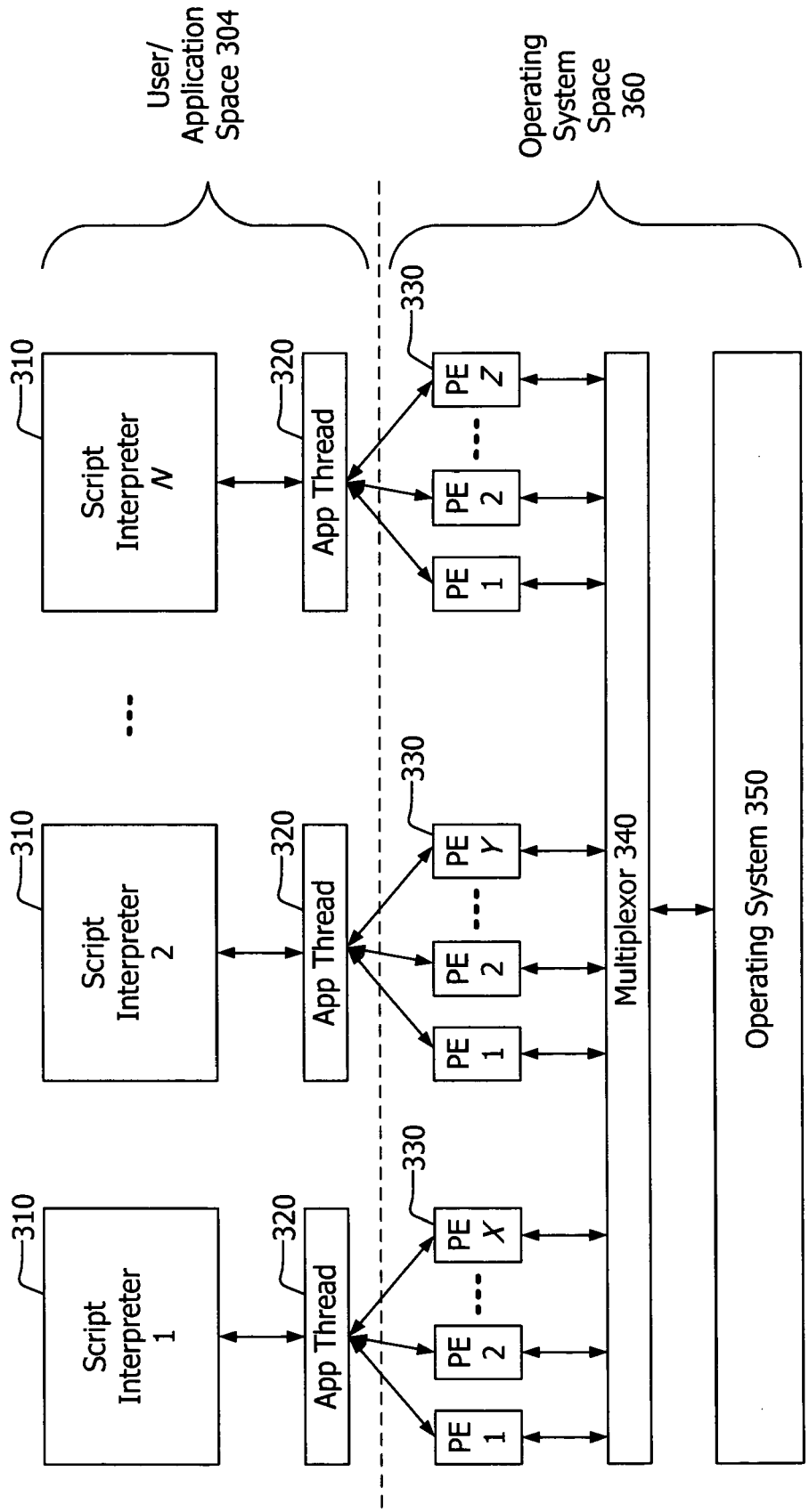
FIG. 3 is a second functional block diagram of operating units in accordance with the invention.

FIG. 3 is a second functional block diagram of operating units in accordance with the invention. Script interpreters 310 receive and execute test scripts. For each test script, the script interpreter invokes an application thread 320. The application threads 320 execute a protocol engine 330 for each command in the script. The operating system may include extended operations such that the commands in the scripts may be extended operations. To increase the speed of processing the commands in the test scripts, in this embodiment, the protocol engines 330 are moved into the operating system 350. In this embodiment, the script interpreters 310 and the application threads 320 are in user or application space 304, and the protocol engines 330 and the multiplexor are in the operating system space 360.

Figure 4:
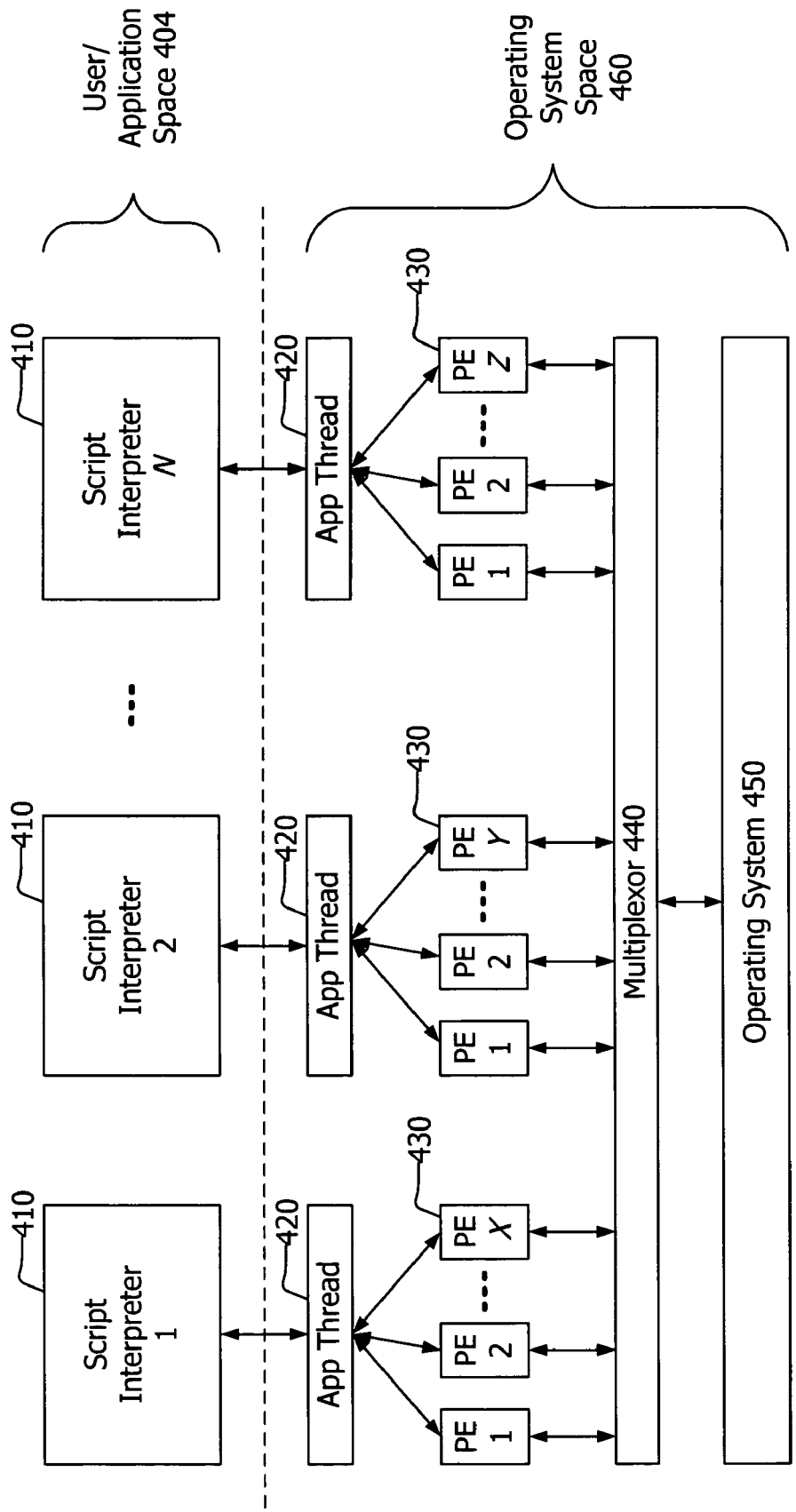
FIG. 4 is a third functional block diagram of operating units in accordance with the invention.

FIG. 4 is a third functional block diagram of operating units in accordance with the invention. As above, the script interpreters 410 receive and execute test scripts. For each test script, the script interpreter 410 invokes an application thread 420. To increase the speed of executing the commands in the test scripts, in this embodiment, the application threads 420 and the protocol engines 430 are moved into the operating system space 360. The application threads 420 execute a protocol engine 430 for each command in the script. The operating system may include extended operations such that the commands in the scripts may be extended operations. In this embodiment, the script interpreters 410 are in the user or application space 404, and the application threads 420, the protocol engines 430 and the multiplexor are in the operating system space 460.

With regard to all of the network testing systems descried herein, additional and fewer units, blocks, communication lines, modules or other arrangement of software, hardware, firmware and data structures may be used to achieve the system and techniques described herein.

Methods

Figure 5:
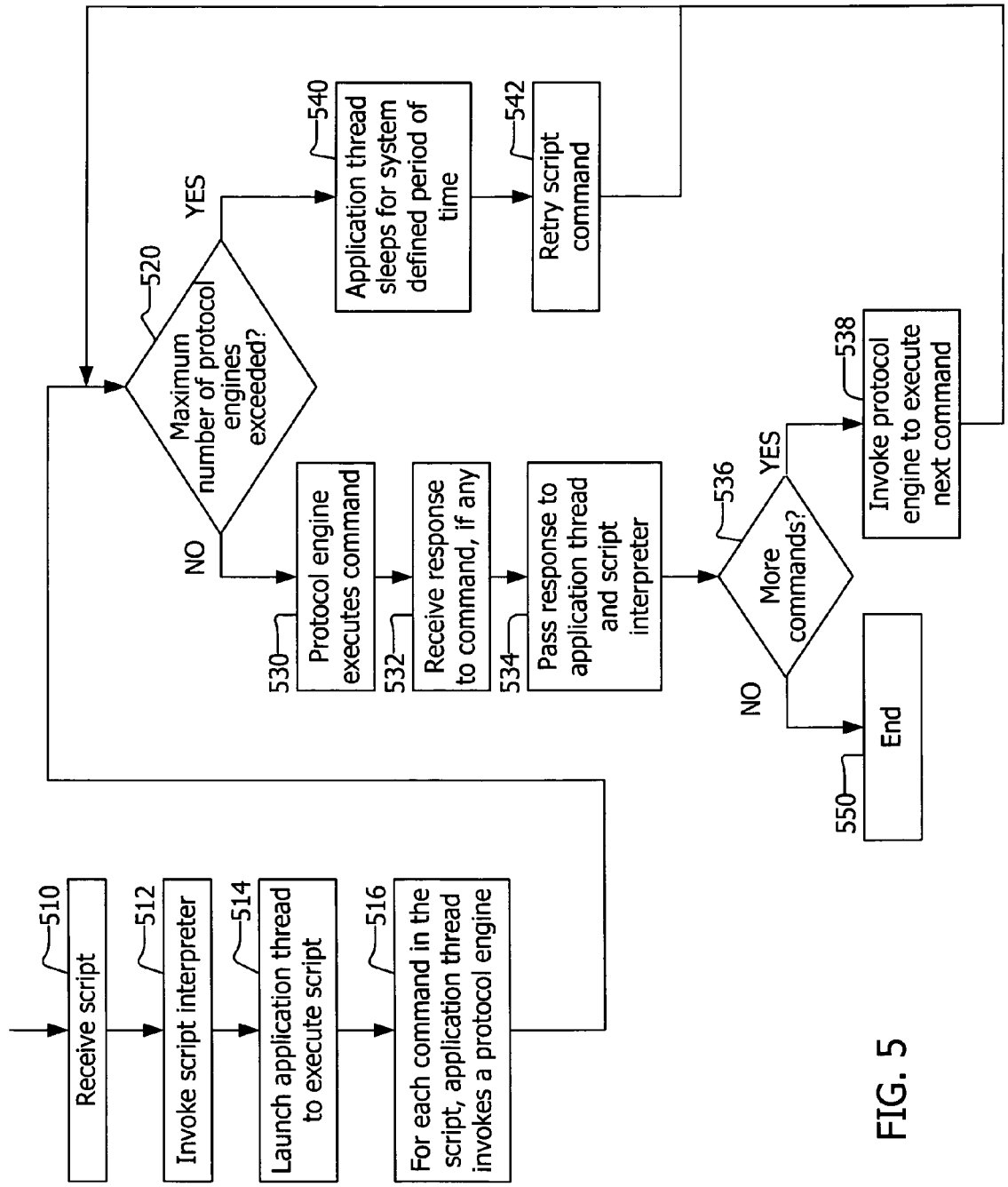
FIG. 5 is a flow chart of a method in accordance with the invention.

FIG. 5 is a flow chart of a method in accordance with the invention. A test script is received, as shown in block 510. A script interpreter is invoked for each test script received, as shown in block 512. For each script interpreter, an application thread is launched to execute the script, as shown in block 514. For each command in the script, the application thread invokes a protocol engine, as shown in block 516.

Although the protocol engine has been invoked, before the protocol engine executes the command that was provided it, a check is made to determine whether a maximum number of protocol engines has been exceeded, as shown in block 520. Alternatively, the check for whether the maximum number of protocol engines has been exceeded may be made before the protocol engine is invoked.

The maximum number of protocol engines may vary depending on the protocol. As such, the maximum number of protocol engines may be based on the particular command's protocol. For example, the number of HTTP protocol engines may be 4,000, while the maximum number of FTP protocol engines may be 1,000. The maximum number of protocol engines may be a system defined constant. The maximum number of protocol engines may vary and may be dependent on available system resources such as one or more of actual and virtual memory availability, memory address space usage, and other factors. In addition, a limit on the number of active protocol engines per simulated virtual user may be imposed. Such a limit may be arbitrary or may be derived from one or more of the size of available actual memory, available virtual memory, memory address space usage, and other factors.

If the maximum number of protocol engines is not exceeded, as shown in block 520, the protocol engine executes the command, as shown in block 530. The execution of the command causes data units to be sent onto a network. A response to the command, if any, may be received, as shown in block 532. A received response may be passed by the protocol engine to the application thread and then to the script interpreter, as shown in block 534.

A check is then made to determine whether there are more commands in the script, as shown in block 536. If there are more commands, the same or another protocol engine may be invoked to execute the next command, as shown in block 538. The flow of execution continues at block 520, with the check for whether the maximum number of protocol engines has been exceeded. If there are no further commands in the script, the execution of the script ends, as shown in block 550.

If the maximum number of protocol engines is exceeded, as shown in block 520, the application thread may sleep for a network testing system defined period of time, as shown in block 540. An attempt may then be made to retry executing the script command protocol engine, as shown in block 542. The flow of actions then continues at block 520, where the check for whether the maximum number of protocol engines has been exceeded is made again. In another embodiment, the action taken at block 540 is replaced with the application thread sleeping until a protocol engine becomes available. The availability of a protocol engine may be determined based on available network testing system resources.

Additional and fewer steps may be taken, and the steps may be combined or further refined to achieve the methods described herein.

Although exemplary embodiments of the invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention.

It is claimed:

1. A method of creating network traffic replicating activities of a large number of users comprising:
   receiving a test script including a plurality of commands specifying extended operations of an operating system
   invoking a script interpreter
   launching an application thread to execute the test script, wherein the application thread is a light weight thread capable of invoking the extended operations, the application thread requiring a smaller amount of memory, less processor power, and less communication with the operating system when compared to traditional threads
   invoking a protocol engine for each of the commands in the test script such that each protocol engine has an associated command,
   each protocol engine executing its associated command.

2. The method of claim 1 wherein the commands in the test script simulate actions taken by a network user.

3. The method of claim 1 wherein the extended operations include "fetch," "verify," "fetch and verify," "fetch and ignore," "monitor," and "count."

4. The method of claim 1 wherein the test script causes network traffic to be produced.

5. The method of claim 1 wherein each protocol engine executing its associated command comprises:
   checking whether a maximum number of protocol engines has been exceeded
   performing the executing when the maximum number of protocol engines has not been exceeded.

6. The method of claim 5 wherein the checking further comprises:
   waiting a system defined amount of time until attempting to execute again.

7. The method of claim 5 wherein the checking further comprises:
   sleeping until system resources sufficient for the executing of the protocol engine are available until attempting to execute again.

8. The method of claim 1 wherein the network traffic is comprised of a plurality of data units adhering to a plurality of communications protocols.

9. The method of claim 8 wherein the plurality of communication protocols includes at least one of Ethernet, User Datagram Protocol (UDP), Transmission Control Protocol (TCP), Internet Protocol (IP), File Transfer Protocol (FTP), or Hypertext Transfer Protocol (HTTP).

10. A non-transitory computer readable medium having instructions stored thereon which when executed cause a processor to perform operations comprising:
    receiving a test script including a plurality of commands specifying extended operations of an operating system
    invoking a script interpreter
    launching an application thread to execute the test script, wherein the application thread is a light weight thread capable of invoking the extended operations, the application thread requiring a smaller amount of memory, less processor power, and less communication with the operating system when compared to traditional threads
    invoking a protocol engine for each of the commands in the test script such that each protocol engine has an associated command,
    each protocol engine executing its associated command.

11. The non-transitory computer readable medium of claim 10 wherein the commands in the test script simulate actions taken by a network user.

12. The non-transitory computer readable medium of claim 10 wherein the extended operations include "fetch," "verify," "fetch and verify," "fetch and ignore," "monitor," and "count."

13. The non-transitory computer readable medium of claim 10 wherein the test script causes network traffic to be produced.

14. The non-transitory computer readable medium of claim 10 wherein each protocol engine executing its associated command comprises:
    checking whether a maximum number of protocol engines has been exceeded
    performing the executing when the maximum number of protocol engines has not been exceeded.

15. The non-transitory computer readable medium of claim 14 wherein the checking further comprises:

waiting a system defined amount of time before attempting to execute again.

16. The non-transitory computer readable medium of claim 10 coupled with a network testing system.

17. The non-transitory computer readable medium of claim 16 wherein the network testing system is coupled to a production network.

18. The non-transitory computer readable medium of claim 17 wherein the network testing system is coupled to a test network.

19. A system to create network traffic simulating activities of a large number of users, the system comprising:
 a plurality of script interpreter units in user space, each script interpreter unit to interpret a script including a plurality of commands, the commands specifying extended operations of an operating system
 an application thread in user space for each script interpreter unit, wherein each application thread is a light weight thread capable of invoking the extended operations, each application thread requiring a smaller amount of memory, less processor power, and less communication with the operating system when compared to traditional threads
 a plurality of protocol engines in user space for each application thread, each protocol engine to execute a command included in one of the scripts
 an operating system in operating system space
 an I/O multiplexor between the operating system in operating system space and the protocol engines in user space, the I/O multiplexor operating in user space and operating system space and configured so that the protocol engines do not have to wait for or block on the operating system, the I/O multiplexor configured to
  receive calls to the operating system from the protocol engines and direct the calls to the operating system
  receive responses from the calls placed with the operating system from the operating system and pass the responses an appropriate protocol engine.

20. The system of claim 19 wherein the system supports a plurality of communications protocols.

21. The system of claim 20 wherein the plurality of communications protocols includes at least Ethernet, User Datagram Protocol (UDP), Transmission Control Protocol (TCP), Internet Protocol (IP), and Hypertext Transfer Protocol (HTTP).

22. The system of claim 19 wherein the extended operations include "fetch and verify" and "fetch and ignore."

23. A system to create network traffic simulating activities of a large number of users, the system comprising:
 a plurality of script interpreter units in user space, each script interpreter unit to interpret a script including a plurality of commands, the commands specifying extended operations of an operating system
 an application thread in user space for each script interpreter unit, wherein each application thread is a light weight thread capable of invoking the extended operations, each application thread requiring a smaller amount of memory, less processor power, and less communication with the operating system when compared to traditional threads
 a plurality of protocol engines in operating system space for each application thread, each protocol engine to execute a command included in one of the scripts
 an operating system in operating system space
 an I/O multiplexor between the operating system and the protocol engines, the I/O multiplexor configured so that the protocol engines do not have to wait for or block on the operating system, the I/O multiplexor configured to
  receive calls to the operating system from the protocol engines and direct the calls to the operating system
  receive responses from the calls placed with the operating system from the operating system and pass the responses an appropriate protocol engine.

24. The system of claim 23 wherein the system supports a plurality of communications protocols.

25. The system of claim 24 wherein the plurality of communications protocols include one or more of Ethernet, User Datagram Protocol (UDP), Transmission Control Protocol (TCP), Internet Protocol (IP), and Hypertext Transfer Protocol (HTTP).

26. The system of claim 23 wherein the extended operations include "fetch and verify" and "fetch and ignore."

27. A system to create network traffic simulating activities of a large number of users, the system comprising:
 a plurality of script interpreter units in user space, each script interpreter unit to interpret a script including a plurality of commands, the commands specifying extended operations of an operating system
 an application thread in operating system space for each script interpreter unit, wherein each application thread is a light weight thread capable of invoking the extended operations, each application thread requiring a smaller amount of memory, less processor power, and less communication with the operating system when compared to traditional threads
 a plurality of protocol engines in operating system space for each application thread, each protocol engine to execute a command included in one of the scripts
 an operating system in operating system space
 an I/O multiplexor between the operating system and the protocol engines, the I/O multiplexor configured so that the protocol engines do not have to wait for or block on the operating system, the I/O multiplexor configured to
  receive calls to the operating system from the protocol engines and direct the calls to the operating system
  receive responses from the calls placed with the operating system from the operating system and pass the responses an appropriate protocol engine.

28. The system of claim 27 wherein the system supports a plurality of communications protocols.

29. The system of claim 28 wherein the plurality of communications protocols includes at least one of the following: Ethernet, User Datagram Protocol (UDP), Transmission Control Protocol (TCP), Internet Protocol (IP), and Hypertext Transfer Protocol (HTTP).

30. The system of claim 27 wherein the extended operations include "fetch and verify" and "fetch and ignore."

* * * * *